United States Patent

Magee

[15] 3,675,357
[45] July 11, 1972

[54] CATTLE IDENTIFICATION APPARATUS

[72] Inventor: Harry H. Magee, 1025 Lagonda Way, Danville, Calif. 94526

[22] Filed: Nov. 7, 1969

[21] Appl. No.: 874,740

Related U.S. Application Data

[63] Continuation-in-part of Ser. No. 794,516, Jan. 28, 1969, abandoned.

[52] U.S. Cl. ............................................................40/300
[51] Int. Cl. ......................................................A01k 11/00
[58] Field of Search ..........................40/300, 301; 119/135

[56] References Cited

UNITED STATES PATENTS

| | | | |
|---|---|---|---|
| 3,503,148 | 3/1970 | Nichols | 40/300 |
| 3,512,289 | 5/1970 | Hayes | 40/301 |
| 3,526,987 | 9/1970 | McCarty | 40/301 |
| 3,334,434 | 8/1967 | Melin | 40/301 |
| 3,552,051 | 1/1971 | Ritchey | 40/301 |

*Primary Examiner*—Robert W. Michell
*Attorney*—Townsend and Townsend

[57] ABSTRACT

An apparatus and process in which a bow tie shaped identification tag is fastened at its narrowed central portion through holes punched in the loose neck skin of a bovine.

1 Claim, 12 Drawing Figures

FIG_1
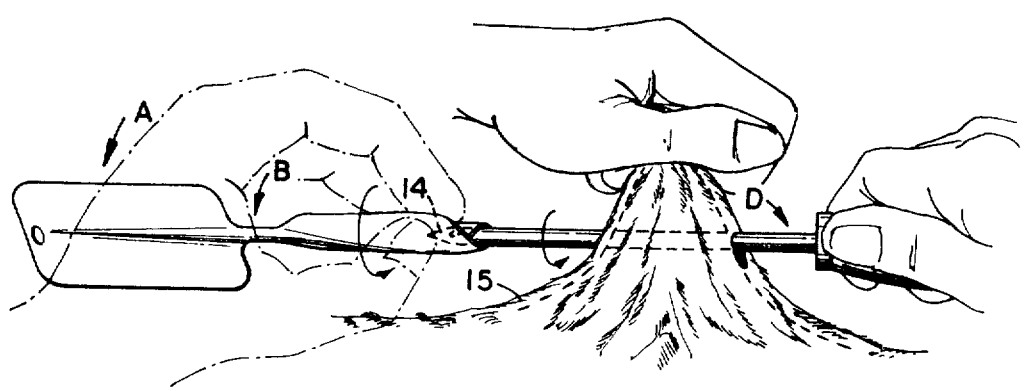
FIG_2
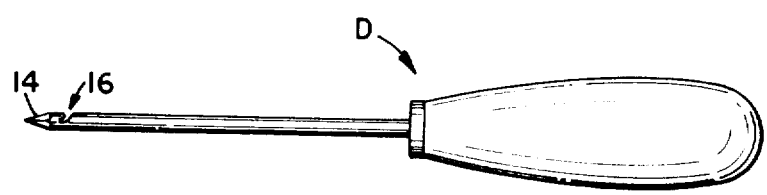
FIG_3
INVENTOR
HARRY H. MAGEE
BY
Townsend and Townsend
ATTORNEYS

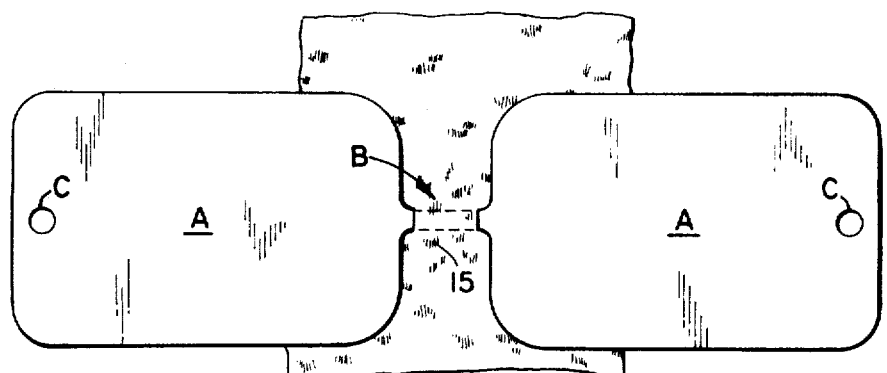
FIG_4
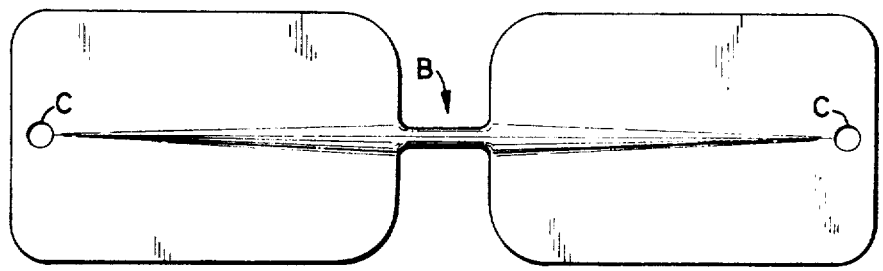
FIG_5
FIG_6
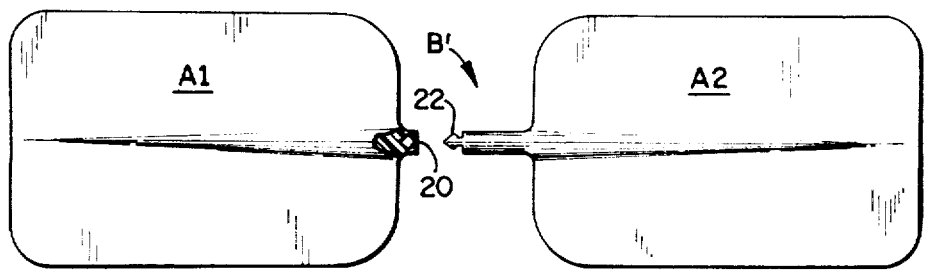
FIG_7
INVENTOR.
HARRY H. MAGEE
BY
*Townsend and Townsend*
ATTORNEYS

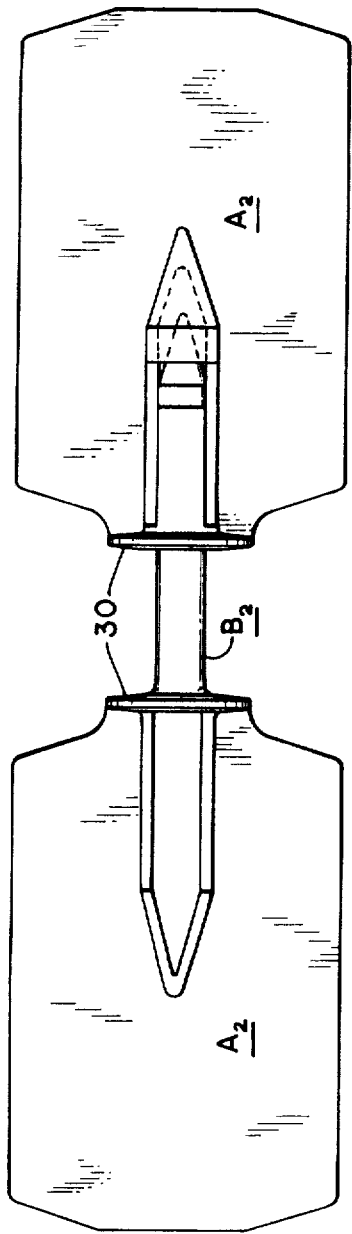
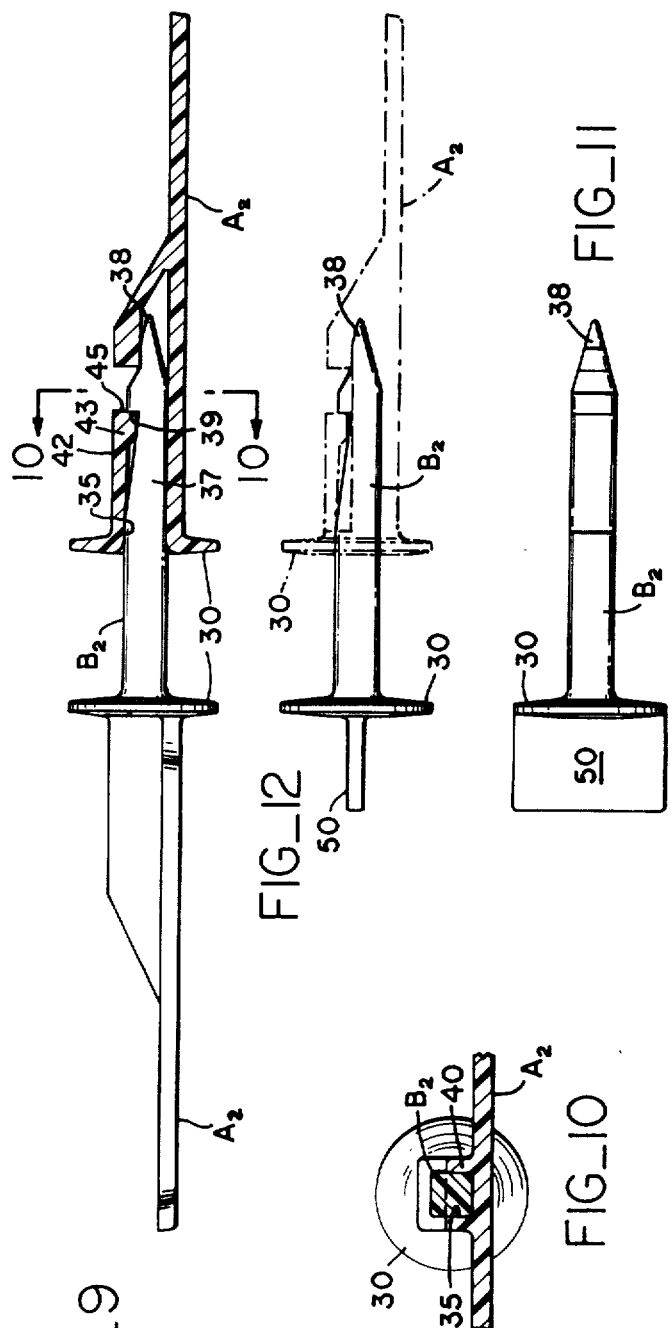
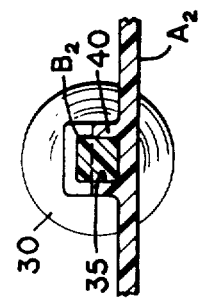
INVENTOR.
HARRY H. MAGEE
BY
Townsend and Townsend
ATTORNEYS

CATTLE IDENTIFICATION APPARATUS

This application is a continuation-in-part application of the copending patent application bearing Ser. No. 794,516, filed Jan. 28, 1969, and entitled "Cattle Identification Apparatus and Process," now abandoned.

This invention relates to cattle marking tags and a process for marking cattle in which a tag is affixed to the loose hide.

The branding or marking of cattle for identification purposes is notoriously old. Typically, the hide is burned in the vicinity of the loin (usually by a hot iron) so as to leave scar tissue exposed which clearly identifies the animal. Unfortunately, such brands detract from the value of the animal's hide when slaughtered as much as 42 percent. Moreover, brands burned in an animal's hide contain insufficient information. It is not possible to record the animal's breeding, age, lot identification, and other information essential to modern livestock techniques.

Of recent years, ear tags have been used. These tags are typically fastened through a hole punctured in the cartilage and hide of the animal's ears. While these tags can record the required amount of information, they suffer the serious disadvantags of being easily separated from the animal. Furthermore, ear tags are small, hard to see from a distance and often become obstructed by the heavy coats of some cattle to a point where they cannot be detected on the range. Moreover, ear tags cannot serve to identify the hide of the animal beyond the first stages of the slaughtering process when the head is severed from the remainder of the animal's carcass.

An object of this invention is to provide a cattle identification tag which may be fastened to holes punctured in the loose neck skin of an animal's hide without the possibility of separation. A bow tie shaped tag having two flexible enlarged wings interconnected by a round and circular shaft is fastened through paired holes punctured in the animal's hide in the vicinity of the neck. The shaft extends under the animal's hide and protrudes outwardly above the hide through the paired holes at either end to give sufficient purchase to the animal's hide to make separation under normal range conditions not possible. The flexible flaps at either end of the interconnecting shaft prevent the shaft from moving axially out from under the animal's hide while permanently fastening the tag.

An advantage of this invention is that the tag as fastened to the loose neck skin of the animal can be given a size wherein it is clearly visible on the open range. Moreover, the tag as fastened to the neck skin of the bovine is in an elevated location where it can readily be observed either when the animal is on the hoof or when the animal has been slaughtered and the hide has been removed.

An additional advantage of this invention is that by foregoing the burning of the hide, as in traditional branding, the market value of the hide is improved by as much as 42 percent.

A further advantage of this invention is that the tag is fastened in a location on the bovine where it does not frighten or spook the animal nor irritate the animal at its point of fastening.

An additional object of this invention is to disclose a bow tie shaped tag which can be inserted in the animal's hide without the necessity of pulling the flap or information displaying portion of the tag through a relatively small aperture in the animal's hide.

A further object of this invention is to disclose a tag having a shaft which extends under the hide of a bovine, protrudes outwardly therefrom at both ends and has attached at one end thereof only a planar flap for containing cattle identification information.

An advantage of this invention is that the shaft of the tag, as extending under the loose hide of a bovine, can be fastened at either end to the hide by either the information flap attached to the end of the shaft or alternately a small flange fastened about the tag.

Yet another object of this invention is to disclose a coupling or snap member for conjoining two separate flaps of a tag without permitting rotational movement of one tag flap relative to the other tag flap when the two tag members are conjoined.

Other objects, features and advantages of this invention will become more apparent after referring to the following specification and attached drawings in which:

FIG. 1 is a perspective view of the head and neck of the steer showing the tag of this invention affixed;

FIG. 2 is a perspective side elevation of an animal's hide showing a probe puncturing a hole through the animal's hide for fastening of the tag;

FIG. 3 is a side elevation of a probe suitable for installing the tag of this invention;

FIG. 4 is a plan view of the tag of this invention as attached to a bovine hide;

FIG. 5 is a bottom plan of the tag of this invention showing the construction of the interconnecting shaft;

FIG. 6 is a side elevation of the tag of FIG. 3;

FIG. 7 is a plan view of an alternate embodiment of the tag of this invention;

FIG. 8 is a plan view of yet another embodiment of this invention in which one of the tags forms a female snap aperture for accommodating a male snap member attached to the opposite flap;

FIG. 9 is a side-elevational view of the tag of FIG. 8 illustrating in section the flaps having the female snap aperture attached thereto;

FIG. 10 is an elevational section taken along line 10—10 of FIG. 9;

FIG. 11 is a plan view of a tag according to this invention incorporating only one flap; and, FIG. 12 is an elevational view of the tag member illustrated in FIG. 11.

With reference to FIGS. 4 through 6, the tag comprises two flexible flaps A interconnected by a central shaft B and in the embodiment illustrated is a single unitary piece of plastic.

Each of the flaps A is flexible and elastic in construction. As flexible in construction, the flap A can be convolutely rolled so as to occupy a diameter approximately that of shaft B. As elastic in construction, the flap when released from its rolled disposition will expand to its original planar shape.

Shaft B is circular and of constant cross section as extending between the conjoined flaps A. At either end this shaft extends from its point of conjoinder to each flap inwardly within the flap to form an integral part thereof. As formed within each flap, shaft B has a cross section which tapers from a relatively large cross section at its point of conjoinder to a decreasing section as shaft B extends axially and centrally of the flap away from its point of connection. The shaft terminates and vanishes into the flap at a point short of aperture C. This tapered construction assures that both flaps of the tag are securely fastened to the interconnecting shaft B and prevents the tearing or ripping of any portion of the flap during the life of the tag as fastened to the animal's hide.

It will be noted that each of the flaps A is in co-planar relation. Moreover, shaft B as interconnecting flaps A is in parallel relation to both flaps and has its central axis only slightly below the common plane of the flaps. This construction enables the flaps to lie flat against the hide in a disposition where they will conform to the contour of the animal and will not become impaled upon brush, fencing or the like for so long as the animal is on the hoof.

Both flaps A flare outwardly on either side of shaft B at right angles to the axis of the shaft to impart to the respective tag ends a flap cross section at least three times the width of the interconnecting shaft B. This outward and flared construction prevents the hide from sliding over the end of the shaft and working loose in attachment to the animal. The point of conjoinder between the flaps and shaft is rounded so as to avoid any source of irritation or chafing of the hide which might otherwise occur.

Each flap A defines therein an aperture C located centrally along the longitudinal axis of the flap at a location beyond the termination of shaft B. These apertures enable the flaps to be conveniently pulled through holes punctured in the hide.

With specific reference to FIGS. 2 and 3, the insertion of the tag through an animal's hide is illustrated. Typically, a bovine is confined within a holding chute and gripped by conventional apparatus so as to restrain movement of the animal both at the body and the head. Thereafter, the animal's hide is grasped and folded at the loose neck portion 15 of the hide between the thumb and forefinger. A probe D (illustrated in FIG. 3) having a point 14 for piercing and puncturing the animal's hide is rammed through the skin at a distance from the top of the fold equal to approximately one-half the length of the interconnecting shaft B between the conjoined flaps A.

When probe D has pierced the hide of the animal, both its point 14 and hook 16 will protrude beyond the fold clear of the hide. The tag is placed over hook 16 configured within that end of probe D that has been inserted through the animal's hide. The probe and tag are then rotated. During this rotation the flexible flap A will be slideably grasped in the hand (as illustrated in broken lines in FIG. 2) so as to wrap the flexible tag about the probe in a convolute configuration wherein flap A of the tag becomes circular and of a cross section that can conveniently be drawn through the animal's hide. It will be noted that the tag as convolutely wound about the probe will cover the hook 16 and prevent the hook from pulling the hide when the probe is withdrawn from the paired punctured holes.

When convolutely wound about the probe, the flexible flap A of the tag will be in coaxial relation to shaft B and can be pulled back through the paired holes punctured in the animal's hide when the probe is withdrawn. Subsequently, the flap will be released and unhooked from the probe. When released and unhooked, the tag will elastically expand and resume its original configuration securing the tag to hide as illustrated in FIGS. 1 and 4.

The fastening of the tag to the hide by shaft B effects two purposes. First, shaft B has a length sufficient to insure that it is firmly secured to the animal's hide. Shaft B will not only penetrate underneath the hide of the identified bovine but will additionally fasten under such a length of hide that separation of the tag from the animal is not possible. It has been found that where the shaft B is approximately one-quarter of an inch in diameter and is at least one inch long, the fastening effected will be permanent. Secondly, the rounded dimension of shaft B will effectively plug the hole in the animal's hide and enable healing to rapidly occur about the round apertures punctured in the hide.

The placement of the tag at the loose neck skin of the steer has several important advantages. First, the tag as fastened to the side of the animal near the head will commonly be in an elevated position where it may readily be observed while the animal is on the hoof. Secondly, the tag will remain with the hide after it is severed from the animal. This feature will enable the ownership of the hide to be traced through the slaughtering process. Moreover, as the hide stripped from an animal's carcass is frequently rolled in a convolute configuration from the tail towards the neck, the tag will be placed on an exposed portion of the convolutely rolled hide further facilitating tracing of ownership. Moreover, the size and configuration of the tag will make obscuring of its markings during the slaughtering process by blood, innards and the like not possible.

The disclosed tag has thus far been illustrated having flexible flaps A, which flaps roll or fold so as to fit through holes punctured in the animal's hide. Such rolling or folding, while providing a relatively simple mechanism for insertion of the tag in an animal's hide, may tend to fold, crease or tear the flexible material of flap A. Moreover, the rolled portion of the tag in combination with that portion of shaft B formed integrally with each flexible flap A may tend to distend or enlarge the hole punctured in the animal's hide by the probe when the tag is initially pulled through the hide. Accordingly, there is disclosed in FIG. 7 an embodiment of this invention which obviates these difficulties.

Referring to FIG. 7, a bow tie shaped tag having two conjoined flaps $A_1$ and $A_2$ is illustrated with a snap joining shaft B' extending therebetween. Regarding the shaft B', this shaft protrudes outwardly from flap $A_1$ relatively short distance and defines interior thereof a female snap aperture 20. Conversely, shaft B' extends almost its total length from flap $A_2$ and has affixed at the end thereof a male snap member 22.

In application of the tag, a probe D without a hook 16 is used to puncture the animal's hide in a manner similar to that illustrated in FIG. 2. The probe is then entirely withdrawn and that half of the tag and shaft attached to flap $A_2$ inserted through the hole punctured in the hide. Thereafter, flap $A_1$ at female snap aperture 20 is fastened onto male snap member 22 and conjoinder of the two ends of the tag made. Once the conjoinder is made, the hide is released and the tag remains fastened to the animal in the manner illustrated in FIGS. 1 and 4.

It should be apparent that the two flaps $A_1$ and $A_2$ could be conjoined by any manner such as threaded connections and the like. Moreover, in the embodiment illustrated in FIG. 6, it is not essential that the two flaps be flexible or elastic. The flaps could have a degree of rigidity imparted thereto as folding of the flap is not necessary for their insertion through the hide.

With reference to FIGS. 8, 9 and 10, yet another embodiment of this invention is illustrated. Two tags $A_2$ are here illustrated fastened by a shaft $B_2$ of square cross section. This tag construction differs from those tag constructions previously illustrated in two important aspects. First, shaft $B_2$ has affixed to either end thereof two circular flanges 30. Flanges 30 are attached to the adjacent edges of the respective flaps $A_1$ and $A_2$ and define about shaft $B_2$ an expanded cross-sectional area exceeding at least three times the cross-sectional area of shaft $B_2$. As can be seen when the respective flaps $A_2$ are conjoined, flanges 30 positioned at either end of shaft $B_2$ prevent the shaft from being withdrawn outwardly and from under the hide of the bovine.

Secondly, the square cross-sectioned shaft $B_2$ extends into a female aperture 35 defined interior of right-hand flap $A_2$ of complementary square cross section. As can be seen, the square cross section of shaft $B_2$ and the complementary square cross section of female shaft aperture 35 together prevent rotation of one flap $A_2$ with respect to the other conjoined flap $A_2$.

Shaft $B_2$ is provided with an extended section 37 having a pointed tip 38 and a notch 39 adjacent the end thereof. Typically, notch 39 defines a shoulder having a surface normal to the axial length of shaft $B_2$, which surface is exposed away from point 38 of the shaft. From the bottom of this surface, notch 39 is of tapered construction so as to define within the square cross section of shaft $B_2$ a wedge-shaped indentation.

Female snap aperture 35 configured in right-hand flap $A_2$ includes a U-shaped channel 40 (see FIG. 10) and a resilient upper wall 42 having shoulder 45 for engaging notch 39 on shaft $B_2$.

Fastening of the tag to the hide of the animal is believed apparent in light of the foregoing. Typically, a hole can be pierced in the folded loose hide of a bovine by either a probe D (without the notch 16 as illustrated in FIG. 3) or alternately, by shaft $B_2$ fastened to left-hand flap $A_2$. When the shaft $B_2$ is extended through the folded hide, right-hand flap $A_2$ at female snap aperture 35 is engaged with the outwardly protruding end of shaft $B_2$. Thereafter, the two flaps $A_2$ are moved towards one another with the result that the resilient sidewall 43 is biased outwardly of the tag by point 38 until notch 39 engages with shoulder 45 on sidewall 43 firmly interlocking the two flaps $A_2$ together. As is apparent, withdrawal of shaft $B_2$ from its insertion under the hide of the bovine will be prevented by flanges 30 at either end of shaft $B_2$.

It will be noted, that with the construction herein illustrated it is not necessary that two flaps $A_2$ be fastened to either end of shaft $B_2$. As is apparent, one flap can be removed. A tag member having such a construction is illustrated in FIGS. 11 and 12.

Referring to FIGS. 11 and 12, shaft $B_2$ is illustrated with flange 30 attached to that end of the shaft removed from point 38. Flange 30 along one planar surface attaches to shaft $B_2$. At the other planar surface the shaft includes a small outwardly extending flap 50 of reduced dimension. Flap 50, is not intended primarily for displaying identification information; rather, its sole function is to provide a surface whereby shaft $B_2$ can be conveniently grasped during insertion in the hide of the bovine.

Fastening of the tag to the neck portion of the hide is preferred. It is to be noted that the tag of this invention can be easily adapted to fastening in other locations on the hide should this be desired. Such alternate locations include fastening to the hide adjoining the animal's tail, fastening to the brisket and the like.

These and other modifications of my invention may be practiced, it being understood that the form of my invention as described above is to be taken as a preferred example of the same. Such description has been by way of illustration and example for purposes of clarity and understanding. Changes and modifications may be made without departing from the spirit of my invention.

I claim:

1. A tag for affixing identification information to a bovine hide comprising: a shaft for extending under the hide of said bovine and protruding outwardly from holes punctured in the bovine hide at either end; two substantially equally dimensioned flaps affixed to the opposite ends of said shaft in coplanar relation, said flaps defining a plane tangential to a surface of said shaft, wherein the axis of said shaft is in a plane slightly below that defined by said flaps; said flaps flexible and longitudinally extending outwardly from opposite ends of said shaft, each of said flaps (defining an aperture) having an aperture axially located near the outer edge of said flaps for cooperation with a probe, wherein said flaps can be rolled in coaxial relation in a convolute roll with respect to said shaft; and said flaps elastic for returning to said coplanar relation on release from said convolute roll.

* * * * *